United States Patent
Ionescu

(10) Patent No.: US 9,158,914 B2
(45) Date of Patent: Oct. 13, 2015

(54) EXECUTABLE COMPONENT INJECTION UTILIZING HOTPATCH MECHANISMS

(71) Applicant: CrowdStrike, Inc., Laguna Niguel, CA (US)

(72) Inventor: Ion-Alexandru Ionescu, San Francisco, CA (US)

(73) Assignee: CrowdStrike, Inc., Irvine, CA (US)

( * ) Notice: Subject to any disclaimer, the term of this patent is extended or adjusted under 35 U.S.C. 154(b) by 92 days.

(21) Appl. No.: 13/866,968

(22) Filed: Apr. 19, 2013

(65) Prior Publication Data

US 2014/0317731 A1 Oct. 23, 2014

(51) Int. Cl.
G06F 21/54 (2013.01)
G06F 9/445 (2006.01)

(52) U.S. Cl.
CPC ............ *G06F 21/54* (2013.01); *G06F 9/44521* (2013.01); *G06F 2221/2141* (2013.01)

(58) Field of Classification Search
CPC . H04L 63/1408; H04L 63/1441; H04L 63/14; G06F 21/50; G06F 21/57
USPC .......................................................... 726/22
See application file for complete search history.

(56) References Cited

U.S. PATENT DOCUMENTS

| 7,797,752 | B1 * | 9/2010 | Vaidya et al. | 726/27 |
|---|---|---|---|---|
| 8,065,734 | B1 * | 11/2011 | Kennedy | 726/23 |
| 8,209,757 | B1 * | 6/2012 | Kennedy et al. | 726/23 |
| 8,286,238 | B2 * | 10/2012 | Durham et al. | 726/22 |
| 8,595,820 | B1 * | 11/2013 | Vaidya | 726/13 |
| 8,745,742 | B1 * | 6/2014 | Satish et al. | 726/24 |
| 2004/0075556 | A1 * | 4/2004 | Barnes et al. | 340/551 |
| 2004/0107416 | A1 * | 6/2004 | Buban et al. | 717/170 |
| 2008/0028462 | A1 * | 1/2008 | Burtscher | 726/22 |
| 2013/0333040 | A1 * | 12/2013 | Diehl et al. | 726/24 |
| 2014/0109226 | A1 * | 4/2014 | Diehl et al. | 726/24 |
| 2014/0250524 | A1 * | 9/2014 | Meyers et al. | 726/22 |

FOREIGN PATENT DOCUMENTS

| KR | 101002489 | 12/2010 |
|---|---|---|
| KR | 101097590 | 12/2011 |

OTHER PUBLICATIONS

Fryer, K., Microsoft Press Computer Dictionary, 1997, Microsoft Press, Third Ed., p. 37, 165.*
Erlingsson, "Fay: Extensible Distributed Tracing from Kernels to Clusters", 23rd ACM Symposium on Operting Systems Principles, Oct. 23-26, 2011, 17 pgs.
The PCT Search Report and Written Opinion mailed Sep. 3, 2014 for PCT application No. PCT/US14/33661, 9 pages.

* cited by examiner

*Primary Examiner* — Yonas Bayou
(74) *Attorney, Agent, or Firm* — Lee & Hayes, PLLC

(57) ABSTRACT

Techniques for causing a component loader associated with a hotpatch mechanism to execute a user-mode component which, when executed, creates a user-mode process, thread, or held reference are described herein. The component may further indicate to the component loader that it lacks hotpatch data, causing the component loader to unload the component. In some implementations, a kernel-mode module may initially provide the component to the hotpatch mechanism with an entrypoint of the component set to zero and with hotpatch data for the component loader. The hotpatch mechanism may apply the hotpatch data, modifying the component loader such that the component loader requests execute rights for a section object for the component. The kernel-mode module may then set the entrypoint such that the component becomes executable, and provides the section object and component to the hotpatch mechanism to cause the component loader to execute the component.

20 Claims, 3 Drawing Sheets

EXECUTABLE COMPONENT INJECTION UTILIZING HOTPATCH MECHANISMS

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

Many security exploits attack vulnerabilities of the operating system kernel. Once those exploits have established themselves in the kernel, the exploits use any of a number of mechanisms to create user-mode processes or threads. The user-mode processes or threads allow the exploits to act in user-mode, which provides greater freedom of action to the exploits. These mechanisms have their difficulties, however. For example, an exploit may include a dynamic-link library (DLL) and try to coerce or trick a user-mode process into loading the DLL. This requires substantial programming effort, though, as the exploit is unable to rely on the operating system's loader. In another example, an exploit may write a DLL to disk and cause a user-mode process to load the DLL, but such writes to disk may be detected by security software.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
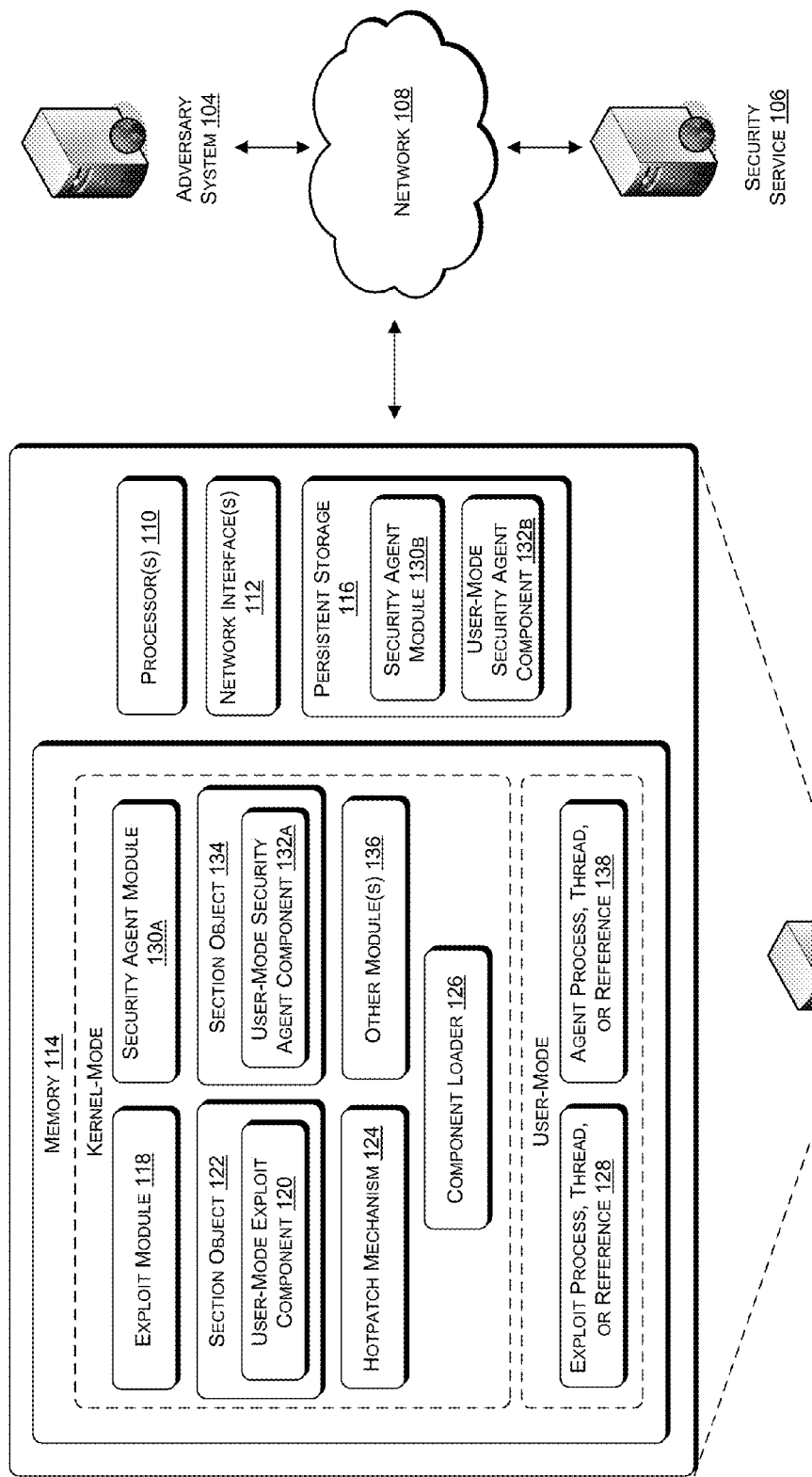
FIG. 1 illustrates an example computing device connected via the network to an adversary system and a security service, the computing device configured with functionality for hotpatching a component loader to cause the component loader to ask for execute rights for a section object for a user-mode component and for causing the component loader to then execute that user-mode component, the user-mode component creating a user-mode process, thread, or held reference.

This disclosure describes, in part, techniques for causing a component loader associated with a hotpatch mechanism to execute a user-mode component which, when executed, creates a user-mode process, thread, or held reference. The user-mode component may further indicate to the component loader that it lacks hotpatch data, causing the component loader to unload the user-mode component.

In some implementations, a computing device may be affected by a security exploit that targets a vulnerability of the computing device's operating system kernel. Upon launching in kernel-mode, a module of the security exploit may take a number of actions to create a process, thread, or held reference for the security exploit in user-mode. To avoid writing any components to disk, the kernel-mode module of the security exploit may initially create a page file-backed section object for a user-mode component of the kernel-mode module, such as a DLL for a user-mode module. The section object may be associated with read/write rights and execute rights, but may not receive execute rights by default because the component is not stored on disk and thus not loaded as an image file-backed section object. Because the system component loader does not request execute rights, they are thus not provided. To obtain a mapping for the section object that provides execute rights, the kernel-mode module provides the section object for the user-mode component to a hotpatch mechanism of the computing device and indicates that the user-mode component represented by the section object includes hotpatch data for a component loader, such as a DLL loader, associated with the hotpatch mechanism. The hotpatch mechanism then modifies a running binary of the component loader with the hotpatch data. The hotpatch data modifies the component loader such that it is capable of asking for execute rights for the section object from the operating system kernel.

After invoking the hotpatch mechanism, the kernel-mode module may set the entrypoint of the user-mode component such that the user-mode component becomes an executable user-mode component. Previously, the entrypoint may have been set to zero so that the hotpatch mechanism would use the user-mode component as a hotpatch rather than treat it as an executable. For example, the kernel-mode module may set the entrypoint to a routine, such as a DLLMain, which, when encountered by the component loader, will cause the component loader to execute the user-mode component. The entrypoint may be located in a program execution header of the user-mode component.

The kernel-mode module may then invoke the hotpatch mechanism for a second time and provide the section object and user-mode component as a hotpatch. The user-mode component may be provided as a hotpatch for any module, as long as the module is already loaded by the target process. The component loader may then request execute rights for the section object from the kernel and load the user-mode component. Upon loading the user-mode component, the component loader encounters the entrypoint and executes the user-mode component. The user-mode component, upon being executed, creates a user-mode process, thread, or held reference for the security exploit and then indicates to the component loader that the user-mode component has no hotpatch data. Upon receiving the indication that the user-mode component lacks hotpatch data, the component loader unloads the user-mode component. As a result of these operations, however, the security exploit now has a user-mode process, thread, or held reference.

In various embodiments, a security service may provide a security agent for a computing device, and the security agent may launch in kernel-mode. For a number of reasons, such as user-interference and detectability, the security service may seek to launch a process, thread, or held reference in user-mode without assistance from the user and without being detected. To accomplish this end, a kernel-mode module of the security agent may invoke the hotpatch mechanism of its associated computing device and may provide an image file-backed section object with execute rights to the hotpatch mechanism. The section object may be associated with an executable user-mode component of the kernel-mode module which, along with that module, is stored on the disk of the computing device. The program execution header of the executable user-mode component may include an entrypoint set to a routine, such as a DLLMain. A component loader associated with the hotpatch mechanism may then load the executable user-mode component, encounter the entrypoint, and execute the executable user-mode component. The executable user-mode component, upon being executed, creates a user-mode process, thread, or held reference for the security service and then indicates to the component loader that the executable user-mode component has no hotpatch data. Upon receiving the indication that the executable user-mode component lacks hotpatch data, the component loader unloads the executable user-mode component.

FIG. 1 illustrates an example computing device 102 connected to an adversary system 104 and a security service 106 via a network 108. The computing device 102, the adversary system 104, and the security service 106 may each be or include a computing device, such as a PC, a laptop computer, a server, a server farm(s), a mainframe, a tablet computer, a work station, a telecommunication device, a PDA, a media player, a media center device, a PVR, a television, an electronic book reader, a set-top box, a camera, a video game console, a kiosk, a gaming device, processor(s), integrated components for inclusion in a computing device, an appliance, an electronic device for inclusion in vehicles, a gaming device, or any other sort of device.

In various embodiments, the adversary system 104 may be associated with any security exploit which is directed to a vulnerability of the computing device 102. The adversary system 104 may provide the security exploit to the computing device 102 in some manner. For example, the adversary system 104 may communicate the security exploit through data packets and may attack a vulnerability of the kernel of the operating system of the computing device 102. As described herein, the security exploit may create a user-mode process, thread or held reference on the computing device 102. Upon creating the user-mode process, thread or held reference, the security exploit may notify the adversary system 104 of the user-mode process, thread or held reference, and the adversary system 104 may communicate with the user-mode process, thread or held reference. In some instances, the adversary system 104 may then remotely control the user-mode process, thread or held reference.

In further embodiments, the security service 106 may be any sort of security service. The security service 106 may install a security agent on the computing device 102, and the security agent may communicate with the security service to provide threat detection, system monitoring, and threat remediation services. While modules of the security agent may operate in kernel-mode, the security agent may also create a user-mode process, thread, or held reference to monitor user-mode processes. An example security agent and security service 106 are described in U.S. patent application Ser. No. 13/492,672, filed on Jun. 8, 2012 and entitled "Kernel-Level Security Agent."

In some embodiments, the network 108 may be any sort of network or networks that connect the computing device 102, adversary system 104, and security service 106. Also, the network 108 may connect any of the computing device 102, adversary system 104, and security service 106 to other devices. The network 108 may be any type of network, such as a wide area network (WAN), a local area network (LAN), or the Internet. Also, the network 108 may be public, private, or include both public and private networks. Further, the network 108 may be wired, wireless, or include both wired and wireless networks. The network 108 may utilize any one or more protocols for communication, such as the Internet Protocol (IP), other packet based protocols, or other protocols. Additionally, the network 108 may comprise any number of intermediary devices, such as routers, base stations, access points, firewalls, or gateway devices.

The computing device 102 may be a device that is targeted by a security exploit, monitored by a security service, or may be both targeted and monitored. While FIG. 1 illustrates several example components of the computing device 102, it is to be appreciated that the computing device 102 may also include other conventional components, such as an operating system, system busses, input/output components, and the like. Also, while the computing device 102 is illustrated as including modules and other components associated with a security exploit of the adversary system 104 and with the security service 106, it is to be understood that the computing device 102 may include only the modules and components of the one or the other.

The computing device 102 includes processor(s) 110, network interface(s) 112, memory 114, and persistent storage 116. The processor(s) 110 may include any one or more central processing units or graphic processing units. The network interface(s) 112 may support both wired and wireless connections to networks, such as cellular networks, radio, WiFi networks, short range networks (e.g., Bluetooth, IR, and so forth.).

The memory 114 is an example of non-transitory computer-readable storage media and may include volatile memory, such as random-access memory (RAM). The persistent storage 116 (also referred to herein as the disk of the computing device 102) is another example of non-transitory computer-readable storage media and may include, but is not limited to, read-only memory (ROM), electrically erasable programmable read-only memory (EEPROM), flash memory, or other memory technology, or any other medium which can be used to store content, applications for access by the computing device 102.

As illustrated, the memory 114 stores an exploit module 118 that is operative in kernel-mode. The exploit module 118 may be a module of a security exploit received from the adversary system 104. As mentioned above, the exploit module 118 may be delivered via data packets or any other sort of mechanisms. Mechanisms for delivering security exploits are manifold and continue to evolve as additional vulnerabilities are discovered. The exploit module 118 may also be associated with a user-mode exploit component 120, such as a DLL for a user-mode module of the security exploit. Once the exploit module 118 is operating on the computing device 102 and stored in its memory 108, the exploit module 118 may create a page file-backed section object 122 for the user-mode exploit component 120. The exploit module 118 creates a page file-backed section object 122 to avoid writing the user-mode exploit component 120 to the persistent storage 116 of the computing device 102. The page file-backed section object 122 may be associated with read/write rights, but not execute rights. This may be a form of protection provided by the computing device 102, preventing execution of components that are not stored in persistent storage 108. The user-mode exploit component 120 (which may include either DLLs or other sorts of exploit components) may either lack an entrypoint or may have its entrypoint set to zero, preventing execution of the user-mode exploit component 120. Such an entrypoint may be located in a program execution header of the user-mode exploit component 120. The user-mode exploit component 120 may also include hotpatch data.

Once the exploit module 118 has created the section object 122, the exploit module 118 may invoke a hotpatch mechanism 124 of the computing device 102 to patch a running instance of a component loader 126. When invoking the hotpatch mechanism 124, the exploit module 118 may provide the section object 122 wrapped around the user-mode exploit component 120 to the hotpatch mechanism 124. An example hotpatch mechanism is described in greater detail in U.S. Pat. No. 7,784,044, issued on Aug. 24, 2010 and entitled "Patching of In-Use Functions on a Running Computer System." The component loader 126 may be a DLL loader associated with the hotpatch mechanism 124. The hotpatch mechanism 124 may modify the component loader 126 at an assembly code level, performing an atomic change of instructions of the component loader 126 with instructions included in the hotpatch data. As a result of the modification, the component loader 126 becomes capable of requesting execute rights for section objects associated with user-mode components (e.g., DLLs), such as section object 122.

In some embodiments, after invoking the hotpatch mechanism 124, the exploit module 118 modifies the user-mode exploit component 120, setting the entrypoint of the user-mode exploit component 120 to a routine, such as a DLL-Main. In one embodiment, the exploit module 118 may also remove or otherwise obscure the hotpatch data from the user-mode exploit component 120.

Upon setting the entrypoint of the user-mode exploit component 120, the exploit module 118 may again invoke the hotpatch mechanism 124, providing the section object 122 wrapped around the user-mode exploit component 120. The exploit module 118 may provide the section object 122 and user-mode exploit component 120 as an update for the running instance of the component loader 126 or as an update for a running instance of any system module within the target process. The component loader 126 may then load the exploit DLL 120 and request execute rights for the section object 122 from the operating system kernel of the computing device 102. With execute rights, the user-mode exploit component 120 may now be executed without crashing the computing device 102. Upon loading the user-mode exploit component 120, the component loader 126 processes the user-mode exploit component 120, encountering the entrypoint. In response to encountering the entrypoint, the component loader 126 executes the user-mode exploit component 120.

In various embodiments, when executed, the user-mode exploit component 120 first creates a process, thread, or held reference 128 operative in the user-mode of the computing device 102. The process, thread, or held reference 128 may then communicate with either or both of the exploit module 118 or adversary system 104 to provide the user-mode access sought by the security exploit. After creating the process, thread, or held reference 128, the user-mode exploit component 120 indicates to the component loader 126 that the user-mode exploit component 120 lacks hotpatch data. The user-mode exploit component 120 may provide such an indication to the component loader 126 regardless of whether it does, in fact, lack hotpatch data. Upon receiving the indication, the component loader 126 unloads the user-mode exploit component 120.

As is further illustrated in FIG. 1, the memory 114 stores a security agent module 130a, and the persistent storage 116 may store a copy of the security agent module 130b. Likewise, the memory 114 stores a user-mode agent component 132a of the security agent module 130a, and the persistent storage 116 stores a copy of the user-mode agent component 132b. The security agent module 130a may be an agent of the security service 106 and may perform monitoring, detection, and remediation operations on the computing device 102. The security agent module 130a may be installed on the computing device, its copy 130b may be stored in persistent storage 116, and may be launched and stored in memory 114 while the computing device 102 runs.

In some embodiments, the security agent module 130a may create an image file-backed section object 134 for the user-mode agent component 132a, and the section object 134 may be associated with execute rights because a copy of the user-mode agent component 132b is stored in persistent storage and loaded as the image file-backed section object 134. The user-mode agent component 132a (which may include either DLLs or other sorts of security agent components) includes an entrypoint set to a routine, such as a DLLMain. Such an entrypoint may be located in a program execution header of the user-mode agent component 132a.

The security agent module 130a may invoke the hotpatch mechanism, providing the section object 134 wrapped around the user-mode agent component 132a as an update for a running instance of a system module, such as one of the one or more other modules 136 of a target process. The component loader 126 may then load the user-mode agent component 132a and process the user-mode agent component 132a, encountering the entrypoint. In response to encountering the entrypoint, the component loader 126 executes the user-mode agent component 132a.

In various embodiments, when executed, the user-mode agent component 132a first creates a process, thread, or held reference 138 operative in the user-mode of the computing device 102. The process, thread, or held reference 138 may then communicate with either or both of the security agent module 130a or security service 106 to provide the user-mode access sought by the security agent/service. After creating the process, thread, or held reference 138, the user-mode agent component 132a indicates to the component loader 126 that the user-mode agent component 132a lacks hotpatch data. The user-mode agent component 132a may provide such an indication to the component loader 126 regardless of whether it does, in fact, lack hotpatch data. Upon receiving the indication, the component loader 126 unloads the user-mode agent component 132a.

Figure 2:
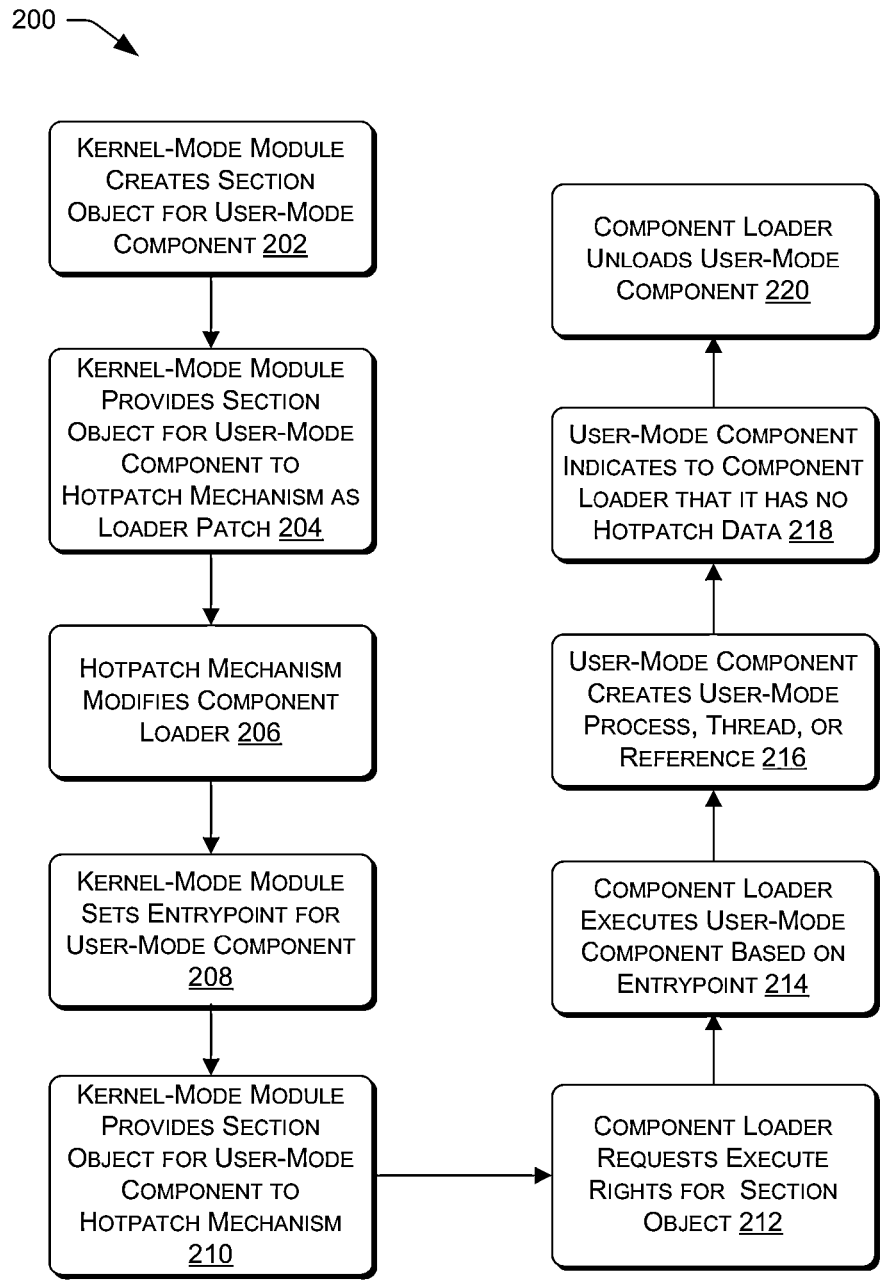
FIG. 2 illustrates an example process for hotpatching a component loader to cause the component loader to ask for execute rights for a section object for a user-mode component and for causing the component loader to then execute that user-mode component, the user-mode component creating a user-mode process, thread, or held reference.
Figure 3:
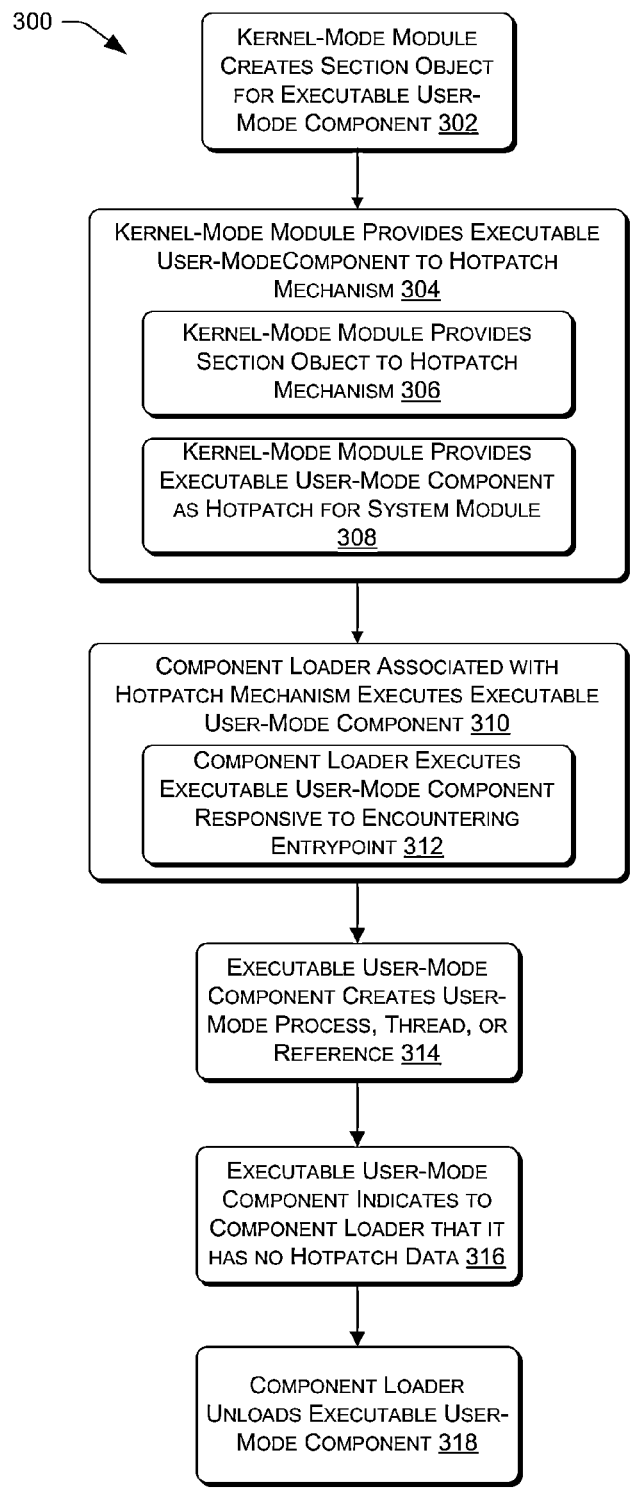
FIG. 3 illustrates an example process for causing a component loader associated with a hotpatch mechanism to execute a user-mode component, the user-mode component creating a user-mode process, thread, or held reference.

FIGS. 2 and 3 illustrate example processes 200 and 300. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 2 illustrates an example process for hotpatching a component loader to cause the component loader to ask for execute rights for a section object for a user-mode component and for causing the component loader to then execute that user-mode component, the user-mode component creating a user-mode process, thread, or held reference. The process 200 includes, at 202, creating, by a kernel-mode module, a section object and associating the section object with a user-mode component of the kernel-mode module. The user-mode component may be a dynamic-link library part of the kernel-mode module. The section object may be a page file-backed section object and may not be associated with execute rights. The kernel-mode module and the user-mode component may be associated with a security exploit.

At 204, the kernel-mode module provides the section object associated with the user-mode component to a hotpatch mechanism. The user-mode component may include hotpatch data for a component loader associated with the hotpatch mechanism.

At 206, the hotpatch mechanism applies the hotpatch data to the component loader, modifying the component loader to cause the component loader to be able to ask for execute rights for the section object. The hotpatch mechanism may apply the hotpatch data by performing an atomic modification of at least a part of binary of the component loader with the hotpatch data.

At 208, the kernel-mode module sets an entrypoint of the user-mode component such that the component becomes an executable user-mode component. Prior to the setting, the entrypoint may be set to zero. The setting may include setting the entrypoint in a program execution header of the user-mode component to a routine which, when encountered by the component loader, causes the component loader to execute the user-mode component.

At 210, the kernel-mode module again provides the section object to the hotpatch mechanism to cause the component loader to execute the user-mode component.

At 212, upon the second providing of the section object, the component loader requests execute rights for the section object.

At 214, responsive to encountering the entrypoint set to the routine, the component loader executes the user-mode component.

At 216, the user-mode component, when executed, creates a user-mode process, thread, or held reference which is associated with the kernel-mode module.

At 218, after the creating, the user-mode component indicates to the component loader that the user-mode component does not include hotpatch data. The indication that user-mode component does not include hotpatch data may be provided regardless of whether the user-mode component includes hotpatch data.

At 220, responsive to receiving the indication, the component loader unloads the user-mode component.

FIG. 3 illustrates an example process for causing a component loader associated with a hotpatch mechanism to execute a user-mode component, the user-mode component creating a user-mode process, thread, or held reference. The process 300 includes, at 302, a kernel-mode module creates an image file-backed section object for an executable user-mode component of the kernel-mode module, the image file-backed section object being associated with execute rights. The kernel-mode module and executable user-mode component may be associated with a security agent. The executable user-mode component may be a dynamic-link library part of the kernel-mode module.

At 304, the kernel-mode module provides the executable user-mode component to a hotpatch mechanism. At 306, providing the executable user-mode component comprises providing the image file-backed section object to the hotpatch mechanism. At 308, the providing comprises providing the executable user-mode component as a hotpatch for a running instance of a system module in the target process.

At 310, a component loader associated with the hotpatch mechanism loads and executes the executable user-mode component. At 312, the component loader executes the executable user-mode component responsive to encountering an entrypoint in a program execution header of the executable user-mode component that is set to a routine which, when encountered by the component loader, causes the component loader to execute the executable user-mode component.

At 314, the executable user-mode component, when executed, creates a user-mode process, thread, or held reference which is associated with the kernel-mode module. At 316, after the creating, the executable user-mode component indicates to the component loader that the executable user-mode component does not include hotpatch data. At 318, responsive to receiving the indication, the component loader unloads the executable user-mode component.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A system comprising:
   a processor;
   a kernel-mode module which, when operated by the processor, performs:
     creating a section object,
     associating the section object with a dynamic-link library,
     first providing the section object associated with the dynamic-link library to a hotpatch mechanism, the dynamic-link library including hotpatch data for a component loader associated with the hotpatch mechanism, the hotpatch data, when applied, modifying the component loader to cause the component loader to request execute rights for the section object,
     setting an entrypoint of the dynamic-link library such that the dynamic-link library becomes executable, and
     second providing the section object to the hotpatch mechanism to cause the component loader to execute the dynamic-link library; and
   the dynamic-link library which, when executed, performs:
     creating a user-mode process, thread, or held reference, and
     after the creating, indicating to the component loader that the dynamic-link library does not include hotpatch data, causing the component loader to unload the dynamic-link library.

2. The system of claim 1, wherein, prior to the setting, the entrypoint of the dynamic-link library is set to zero.

3. The system of claim 1, wherein setting the entrypoint comprises setting the entrypoint in a program execution header of the dynamic-link library to a routine which, when encountered by the component loader, causes the component loader to execute the dynamic-link library.

4. A system comprising:
   a processor;
   a kernel-mode module which, when operated by the processor, provides an executable user-mode component to a hotpatch mechanism; and
   the executable user-mode component including an entrypoint which, when the executable user-mode component is loaded by a component loader associated with the hotpatch mechanism, causes the executable user-mode component to be executed, the execution of the executable user-mode component including:

creating a user-mode process, thread, or held reference which is associated with the kernel-mode module, and after the creating, indicating to the component loader that the executable user-mode component does not include hotpatch data, causing the component loader to unload the executable user-mode component.

5. The system of claim 4, wherein the executable user-mode component is a dynamic-link library.

6. The system of claim 4, wherein the executable user-mode component is provided to the hotpatch mechanism as a hotpatch for a running instance of a system module of a target process.

7. The system of claim 4, wherein the entrypoint is included in a program execution header of the executable user-mode component and is set to a routine which, when encountered by the component loader, causes the component loader to execute the executable user-mode component.

8. The system of claim 4, wherein the kernel-mode module is to create a image file-backed section object for the executable user-mode component and to provide the image file-backed section object to the hotpatch mechanism, the image file-backed section object being associated with execute rights.

9. The system of claim 4, wherein the kernel-mode module and executable user-mode component are associated with a security agent, and the user-mode process, thread, or held-reference provides user-mode capabilities to the security agent.

10. A computer-implemented method comprising:
    first providing, by a kernel-mode module stored in memory of and executing on a computing device, a section object associated with a user-mode component to a hotpatch mechanism, the user-mode component including hotpatch data for a component loader associated with the hotpatch mechanism, the hotpatch data, when applied, modifying the component loader to cause the component loader to request execute rights for the section object;
    setting, by the kernel-mode module executing on the computing device, an entrypoint of the user-mode component such that the user-mode component becomes an executable user-mode component; and
    second providing, by the kernel-mode module executing on the computing device, the section object to the hotpatch mechanism to cause the component loader to execute the user-mode component, the executing the user-mode component including:
        creating, by the user-mode component, a user-mode process, thread, or held reference, and
        after the creating, indicating to the component loader, by the user-mode component, that the user-mode component does not include hotpatch data, causing the component loader to unload the user-mode component.

11. The method of claim 10, wherein the user-mode component is a dynamic-link library.

12. The method of claim 10, further comprising creating the section object and associating the section object with the component.

13. The method of claim 12, wherein the section object is a page file-backed section object.

14. The method of claim 10, wherein the component loader requests the execute rights for the section object responsive to the second providing.

15. The method of claim 10, wherein, prior to the setting, the entrypoint of the component is set to zero.

16. The method of claim 10, wherein setting the entrypoint comprises setting the entrypoint in a program execution header of the user-mode component to a routine which, when encountered by the component loader, causes the component loader to execute the user-mode component.

17. The method of claim 10, wherein the hotpatch mechanism performs an atomic modification of at least a part of binary of the component loader with the hotpatch data.

18. The method of claim 10, wherein the indication that user-mode component does not include hotpatch data is provided regardless of whether the user-mode component includes hotpatch data.

19. The method of claim 10, wherein the user-mode component and the user-mode process, thread, or held reference are associated with a security exploit.

20. The method of claim 19, wherein a kernel-mode module of the security exploit performs the first providing, the setting, and the second providing.

* * * * *